(12) United States Patent
Bücker et al.

(10) Patent No.: US 8,986,478 B2
(45) Date of Patent: Mar. 24, 2015

(54) ADD-ON PART FOR CONNECTING TO A COMPONENT BY TORSIONAL ULTRASONIC WELDING

(75) Inventors: Dirk Bücker, Mönchengladbach (DE); Hergen Görse, Roth (DE); Anton Sautner, Treuchtlingen (DE); Florian Ortner, Weissenburg (DE)

(73) Assignee: Faurecia Exteriors GmbH, Stadthagen (DE)

( * ) Notice: Subject to any disclaimer, the term of this patent is extended or adjusted under 35 U.S.C. 154(b) by 366 days.

(21) Appl. No.: 13/379,684

(22) PCT Filed: Jul. 6, 2010

(86) PCT No.: PCT/EP2010/059611
§ 371 (c)(1),
(2), (4) Date: Jan. 13, 2012

(87) PCT Pub. No.: WO2011/003891
PCT Pub. Date: Jan. 13, 2011

(65) Prior Publication Data
US 2012/0155954 A1    Jun. 21, 2012

(30) Foreign Application Priority Data

Jul. 6, 2009 (DE) .......................... 10 2009 031 984
Dec. 22, 2009 (DE) .......................... 10 2009 060 444

(51) Int. Cl.
*B32B 37/00* (2006.01)
*B29C 65/00* (2006.01)
(Continued)

(52) U.S. Cl.
CPC ............. *B29C 66/474* (2013.01); *B29C 65/082* (2013.01); *B29C 66/1162* (2013.01); *B29C 66/30223* (2013.01); *B29C 66/322* (2013.01); *B29C 66/47421* (2013.01);
(Continued)

(58) Field of Classification Search
CPC ........ B65B 51/225; B29C 66/80; B29C 65/08
USPC .................. 156/73.1, 290, 292, 308.2, 308.4, 156/580.1, 580.2; 403/270
See application file for complete search history.

(56) References Cited

U.S. PATENT DOCUMENTS 4,832,317 A    5/1989    Alaphilippe
5,599,411 A *  2/1997    Schembri .................... 156/73.1
(Continued)

FOREIGN PATENT DOCUMENTS

DE    197 58 075 A1    2/1999
EP    1 410 988 A1     4/2004
(Continued)

*Primary Examiner* — James Sells
(74) *Attorney, Agent, or Firm* — Fulbright & Jaworski LLP

(57) ABSTRACT

A method for welding an add-on part to a component, in particular for a motor vehicle, using the in per se known torsional ultrasonic welding method having a sonotrode for transferring the vibrations generating the welding add-on part has a coupling flange for coupling the vibrations of the sonotrode and the add-on part has coupling elements for coupling the vibrations induced by the sonotrode in the welding region facing the weld interface area of the component, and the coupling elements thereby melt during the welding process and thus weld the add-on part to the component.

13 Claims, 3 Drawing Sheets

(51) Int. Cl.
*B29C 65/08* (2006.01)
*B29K 23/00* (2006.01)
*B29K 105/16* (2006.01)
*B29L 31/30* (2006.01)

(52) U.S. Cl.
CPC ........ *B29K 2023/12* (2013.01); *B29K 2105/16* (2013.01); *B29L 2031/3044* (2013.01)
USPC ........................ 156/73.1; 156/308.2; 403/270

(56) References Cited

U.S. PATENT DOCUMENTS 6,802,411 B2 * 10/2004 Murray et al. ............. 198/345.3

| | | |
|---|---|---|
| 2004/0094255 A1 | 5/2004 | Shinohara et al. |
| 2005/0028492 A1 | 2/2005 | Nagashima et al. |
| 2005/0104389 A1 | 5/2005 | Vadot et al. |
| 2008/0264969 A1 | 10/2008 | Anderson |

FOREIGN PATENT DOCUMENTS

| | | |
|---|---|---|
| EP | 1 930 148 A1 | 6/2008 |
| GB | 2 116 667 A | 9/1983 |
| JP | 04-201236 A | 7/1992 |
| WO | WO 2006/128246 A1 | 12/2006 |
| WO | WO 2010/100225 A1 | 9/2010 |

* cited by examiner

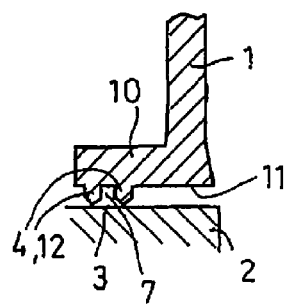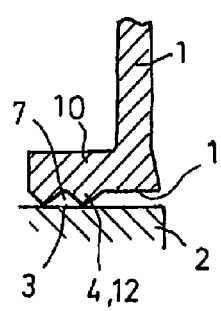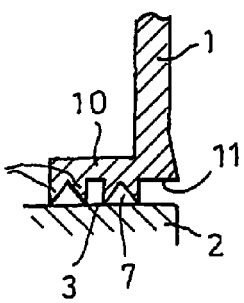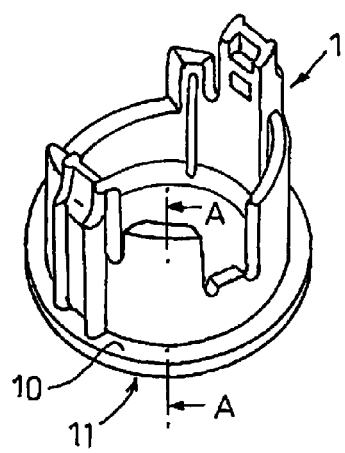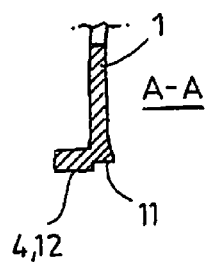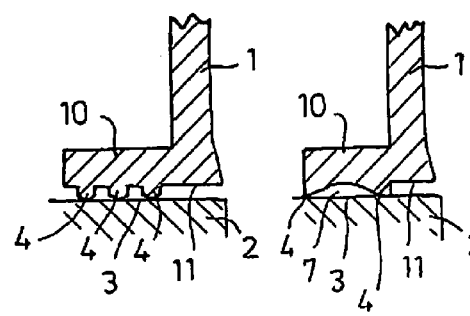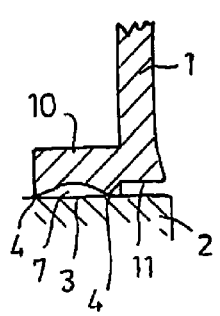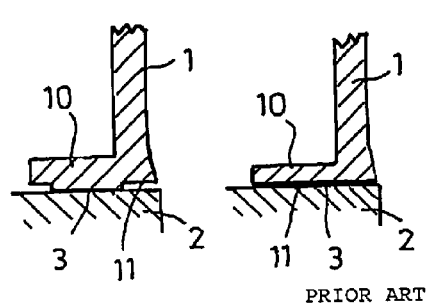

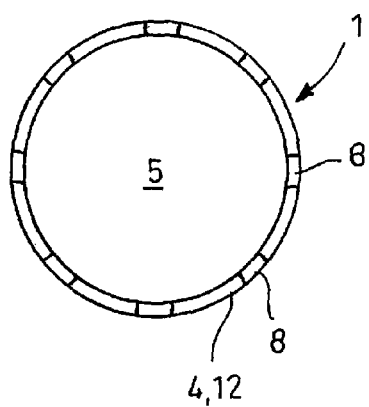
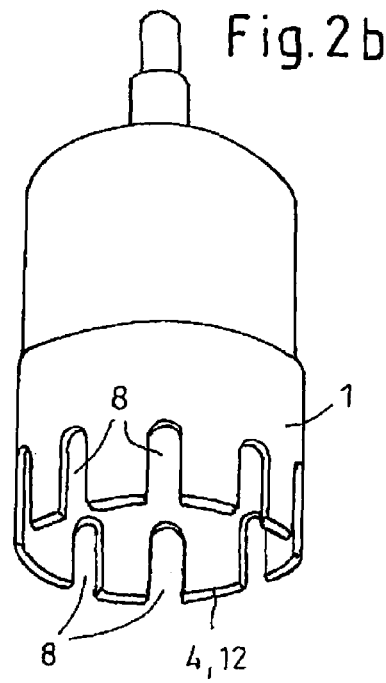
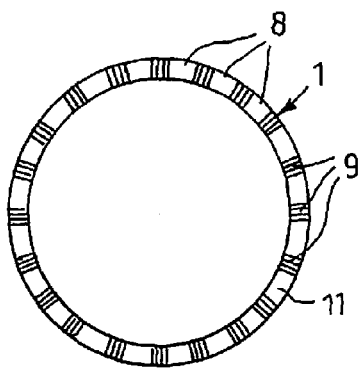
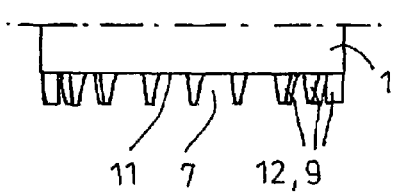

US 8,986,478 B2

ADD-ON PART FOR CONNECTING TO A COMPONENT BY TORSIONAL ULTRASONIC WELDING

This application is a §371 of PCT/EP2010/059611 filed Jul. 6. 2010, and claims priority from DE 10 2009 031 984.0 filed Jul. 6, 2009 and DE 10 2009 060 444.8 filed Dec. 22, 2009.

FIELD OF THE INVENTION

The invention relates to a method for welding a mounting part to a component, in particular for a motor vehicle, using the torsional ultrasonic welding process known per se, having a sonotrode for transmitting the vibrations generated by the welding process to the mounting part to be welded, the mounting part being provided with a coupling surface for coupling the vibrations of the sonotrode, and the mounting part being provided, on the weld region facing the weld surface of the component, with coupling elements for coupling the vibrations induced by the sonotrode, so that the coupling elements melt during the welding process and thus weld the mounting part to the component. In addition, mounting parts for use with this method are proposed.

BACKGROUND OF THE INVENTION

Welding is an established technique for joining components made of plastic. For this purpose, various options are used for providing energy input. Examples are friction welding or ultrasonic welding.

In particular for use for automotive exteriors, due to the possibilities offered by the new material properties in injection molding the current common wall thicknesses during processing are in the range of ≥3.0 mm. The standard type of material used is talc-reinforced PP for cost reasons.

Costs are reduced and component weight is decreased due to the thin wall thickness. However, since compared to other commercial plastics, PP in particular is very susceptible to creep under load and has a low modulus of elasticity, but at the same time the requirements imposed on component welding for retention forces of >200 N at each weld point on the component joint remain unchanged, it is often not possible to join the components in such a way that the surface relevant to the appearance remains free of defects. Two influencing factors hinder mark-free welding:

1.) Process-Related Defects
   The energy introduced for the melting and intimate connection of the parting plane acts through the component in such a way that the surface is deformed due to the difference in shrinkage during cooling of the component, resulting in formation of a defect.
2.) Load-Related Defects
   The forces introduced into the component joint in a punctiform manner during the welding result in visible deformations at the surface when the component thickness and the modulus of elasticity of the surface are excessively low. The surface gives way under the load of the introduced stresses, resulting in formation of a visible defect.

One development for preventing this effect is torsional ultrasonic welding, as described in EP 1 930 148 A1 and currently unpublished DE 10 2009 011273 A1 The upper component situated beneath the sonotrode is set in rotatory vibration in the ultrasonic frequency range. The vibration is transmitted through the upper component, and is converted to heat directly in the parting plane between the upper and lower components. Although the upper component is heated due to its internal damping, it is not melted. On the one hand this reduces the heat acting on the lower component, and on the other hand the effective joining surface for the introduction of force is changed from a punctiform connection to a linear and/or planar connection. As a result, mark-free connections for polyolefinic materials are possible, even for a wall thickness less than 3.0 mm. The occurrence of defects may be prevented in this way.

In the present description, the terms "upper component" and "mounting part," and "lower component" and "component," respectively refer to the same objects. The sonotrode is placed on the mounting part, i.e., the upper component, in order to weld the component situated beneath the mounting part to the mounting part.

The ultrasonic welding technique known as torsional welding requires a high contact pressure. In particular when the surface is slightly soiled from preceding work steps, the required temperature of the weld metal is often not reached, and instead the weld metal is deformed and an intimate connection is prevented. In addition, due to the high contact pressure the liquefied material is pushed from the region of the weld point. A cold weld point with poor adhesion is the result.

OBJECTS AND SUMMARY OF THE INVENTION

The object of the invention is to provide a method by means of which the quantity and duration of the melt at the weld surface during the welding process is increased, and thus the required melting temperature and duration of action for producing the required bond quality are locally achieved. A further aim is to provide mounting parts which allow intimate welding at their weld region as a result of suitable design measures. A further aim is that welding is possible even when there is slight soiling.

BRIEF DESCRIPTION OF THE FIGURES

FIG. 1a shows an embodiment of the weld region on the underside of the mounting part, and shows two ring-shaped protrusions, each forming a ring, which are situated coaxially with respect to one another on the weld region of the mounting part.

FIG. 1b shows an embodiment of the invention with two rings which have a triangular cross section.

FIG. 1c shows an embodiment of the invention having two coaxial rings having a cross section in the shape of mutually facing pyramids, wherein the rings form three weld spaces.

FIG. 1d shows an embodiment of the invention having a sensor holding element as a mounting part 1 for holding a sensor which is to be welded to a bumper as component 2, using the torsional ultrasonic welding process.

FIG. 1e shows an embodiment of the invention having three ring-shaped ribs or rings as protrusions, situated coaxially with respect to one another on the weld region, wherein two collection spaces, storage spaces, or weld spaces for accommodating the melt streams are thus formed.

FIG. 1f shows an embodiment of the invention having two rings having a cross section in which the rings merge into one another over a curve, wherein A collection space is also provided at this location between the rings.

FIG. 1g shows an embodiment of the invention having a cross section of a rectangular rib as a ring 4.

FIG. 1h shows prior art.

FIG. 2a shows a simplified view from the bumper.

FIG. 2b shows an embodiment wherein the ring or the circumferential rib forms a type of crown bit to provide space for the weld metal and to improve a type of saw effect for the penetration of possible soiling particles.

FIG. 3a shows a simplified view from below the sensor holding element as a mounting part, having radial ribs.

FIG. 3b shows an embodiment of the invention with trapeziodal welding ribs.

DETAILED DESCRIPTION

Figure 4A:
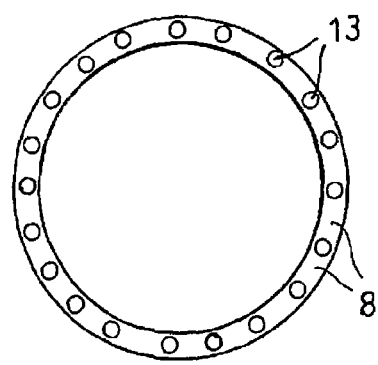
FIG. 4a shows a simplified view from below the senor holding element having welding nibs instead of welding ribs.
Figure 4B:
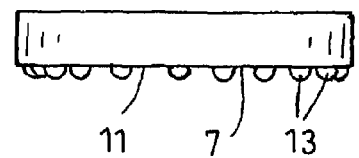
FIG. 4b shows a simplified view from below the senor holding element having welding nibs instead of welding ribs.

According to the invention, the object with regard to the method is achieved in that protrusions which extend essentially perpendicularly to the weld region and which are situated in such a way that the melt substantially remains on the weld surface are used as coupling elements. It has been shown in tests that welding of two components is ensured at the moment when the required contact pressure for coupling the ultrasound is guaranteed, and also when the melt is prevented from being directly pushed away from the weld surface. The protrusions are therefore situated in such a way that pushing away of the melt is reduced or prevented.

In a refinement of the invention, the melt is directed beneath adjacent protrusions, or two parallel resulting melt flows are directed against one another. A resulting melt flow may also be guided in a targeted manner beneath adjacent protrusions which have yet to melt. This is referred to as a sacrificial protrusion. A reservoir of melt is formed when two parallel resulting melt flows are directed against one another.

Mounting parts according to the invention are described below which allow the intimate welding at their weld region as the result of suitable design measures.

Mounting parts are described which have at least one weld region which is provided for welding to a component, wherein the welding is intended to be carried out using the torsional ultrasonic welding process known per se, having a sonotrode for transmitting the vibrations generated by the welding process to the mounting part to be welded, the mounting part having a coupling surface for coupling the vibrations of the sonotrode, and the mounting part being provided, on its weld region facing the provided weld surface on the component, with coupling elements for coupling the vibrations induced by the sonotrode, so that the coupling elements melt during the welding process and thus weld the mounting part to the component.

According to the invention, the coupling elements are protrusions which extend essentially perpendicularly to the weld region.

In one embodiment according to the invention, the protrusions are ribs or nibs.

In one embodiment, the protrusions form an elevated chain having interruptions. This elevated chain having interruptions may be situated on the weld region in such a way that the melt flow remains in the region of the weld surface and is not pushed away.

For a mounting part having a ring-shaped weld region, the protrusions are preferably two coaxially situated rings which delimit the ring-shaped weld region. The melt, which is located within the coaxially situated rings, cannot be pushed away from the weld region on account of the rings.

In addition to the previous description, the geometry of the protrusions or the particular rib geometry may be radially interrupted at the diameter in order to provide space for the weld metal on the one hand, and on the other hand to improve a type of saw effect for the penetration of possible soiling particles, i.e., slight "burying" into the actual component surface. This is preferably used for protrusions which form a ring and surround the weld region.

For directing the melt flow, the protrusions may have a triangular, M-shaped, wedge-shaped, trapezoidal, or undulating cross section.

The invention is explained in greater detail below with reference to the figures.

In the torsional ultrasonic welding process (see FIG. 5), a sonotrode (not shown in the figures) is used for transmitting the vibrations generated by the welding process to the mounting part 1 to be welded, and is placed on the coupling surface 10. In the present description, the mounting part 1 to be welded is also referred to as the upper part, and the component 2 to which the mounting part 1 is to be welded is also referred as the lower part. During the welding process, the vibrations of the sonotrode are transmitted to the weld surface 3, thus welding the mounting part 1 to the component 2. The mounting part 1 as well as the component are plastic parts. In all of the figures shown here, the mounting part 1 is a mounting which is welded to a bumper as component 2. The mounting is used for holding an ultrasonic parking sensor (not shown). For this purpose, the mounting part 1 has a borehole 5 for accommodating the ultrasonic parking sensor. The arrow 6 in FIG. 5 indicates the vibrations that are generated by the sonotrode during the welding process.

The method according to the invention and the mounting parts 1 are preferably used in the automotive field, and preferably involve exterior or interior parts made of plastic. One preferred application is the welding of mounting parts 1 to visible exterior parts of the motor vehicle. For example, this method may be used to weld mounting parts 1 to a bumper or a wheel housing, for example.

According to the invention, the mounting parts 1, i.e., upper parts, are designed during manufacture in such a way that they may be easily welded to components 2, i.e., lower parts. using the method according to the invention. Since this adaptation to the upper parts is visible, an assessment may be made as to whether the upper parts have been prepared for using the method according to the invention.

FIG. 1d shows a sensor holding element as a mounting part 1 for holding a sensor which is to be welded to a bumper as component 2, using the torsional ultrasonic welding process. In the present case, the sensor holding element, i.e., mounting part 1, is the upper part, and the bumper, as component 2, is the lower part. During the welding process, a cylindrical torsion sonotrode (not shown) is placed on the coupling surface 10. The vibrations of the torsion sonotrode are thus transmitted via the coupling surface 10 to the sensor holding element, and are transmitted via the sensor holding element to the lower part (the bumper), thus welding the upper part to the lower part. The upper and lower parts are plastic parts.

Figure 5:
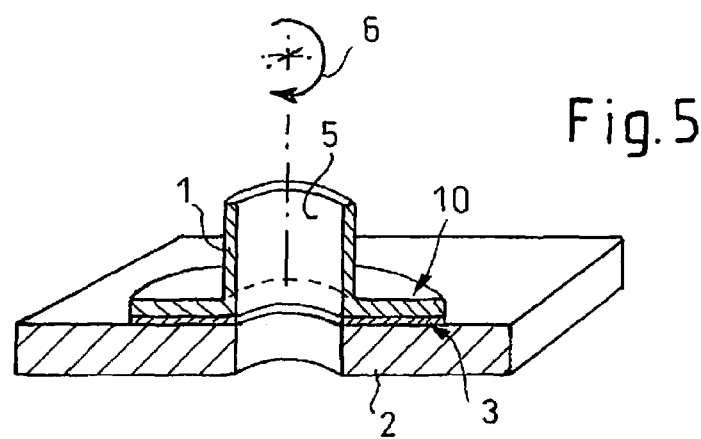
FIG. 5 has an arrow which indicates the vibrations that are generated by the sonotrode during the welding process.

FIGS. 1a, 1b, 1c, 1e, 1f, 1g, 1h show various embodiments of the weld region 11 on the underside of the mounting part 1, i.e., the part which rests on component 2 (also see FIG. 5). FIG. 1a shows two ring-shaped protrusions 12, each forming a ring 4, which are situated coaxially with respect to one another on the weld region 11 of the mounting part 1. In the present embodiment, the rings 4 have a rectangular cross section and have a tip. During the welding process the rings 4 rest on the weld surface 3 on component 2, and delimit a weld space 7. FIG. 1b likewise shows two rings 4, which, however, have a triangular cross section, and which likewise delimit a weld space 7. The weld space 7 is used as a reservoir or storage space for the melt during the welding process. Between the rings 4, two melt streams meet which are produced by the melting of the two rings 4, and which therefore cannot be pushed away.

FIG. 1c shows two coaxial rings 4 having a cross section in the shape of mutually facing pyramids. These rings form three weld spaces 7. FIG. 1e shows three ring-shaped ribs or rings 4 as protrusions, situated coaxially with respect to one another, on the weld region 11 on the underside of the mounting part 1. Two collection spaces, storage spaces, or weld spaces 7 for accommodating the melt streams are thus formed. FIG. 1f shows two rings 4 having a cross section in which the rings merge into one another over a curve. A collection space is also provided at this location between the rings 4. FIG. 1g shows a cross section of a rectangular rib as a ring 4, and FIG. 1h shows the prior art.

FIGS. 2a, b show a simplified view, viewed from the bumper as component 2, of the weld region 11 of the mounting part 1, i.e., a sensor holding element, having only one circumferential elevated protrusion 12 as a ring 4. According to the invention, in one embodiment of the invention the circumferential ring 4 is radially interrupted at the diameter. The interruptions are denoted by reference numeral 8. In principle, the ring 4 or the circumferential rib forms a type of crown bit, as shown in FIG. 2b, to provide space for the weld metal on the one hand, and on the other hand to improve a type of saw effect for the penetration of possible soiling particles, i.e., slight "burying" into the actual component surface.

FIG. 3a shows a simplified view from below of the sensor holding element as a mounting part 1, having radial ribs 9 which may also be referred to as welding ribs. FIG. 3b shows trapezoidal welding ribs 9. FIGS. 4a, b show a simplified view from below of the sensor holding element having welding nibs 13 instead of welding ribs.

It is claimed:

1. A method for welding a sensor holding element to a component, in particular for a motor vehicle, using the torsional ultrasonic welding process, having a sonotrode for transmitting the vibrations generated by the welding process to the sensor holding element to be welded, wherein the sensor holding element is provided with a coupling surface for coupling the vibrations of the sonotrode, and the sensor holding element being provided, on the ring-shaped weld region facing the weld surface on the component, with coupling elements for coupling the vibrations induced by the sonotrode, so that the coupling elements melt during the welding process and thus weld the sensor holding element to the component, wherein protrusions which extend essentially perpendicularly to the ring-shaped weld region and which are situated in such a way that the melt substantially remains on the weld surface are used as coupling elements and wherein the protrusions are two coaxially situated rings which delimit the ring-shaped weld region.

2. A method according to claim 1, wherein the melt is directed beneath adjacent protrusions, or two parallel resulting melt flows are directed against one another.

3. A mounting part comprising at least one ring-shaped weld region which is provided for welding to a component, wherein the welding is carried out using a torsional ultrasonic welding process, having a sonotrode for transmitting the vibrations generated by the welding process to the mounting part to be welded, the mounting part having a coupling surface for coupling the vibrations of the sonotrode, and the mounting part being provided, on its ring-shaped weld region facing the provided weld surface on the component, with coupling elements for coupling the vibrations induced by the sonotrode, so that the coupling elements melt during the welding process and thus weld the mounting part to the component, wherein the coupling elements are protrusions which extend essentially perpendicularly to the weld region, wherein the mounting part is a sensor holding element for a motor vehicle, and wherein the protrusions are two coaxially situated rings which delimit the ring-shaped weld region.

4. A mounting part according to claim 3, wherein the protrusions are ribs or nibs.

5. A mounting part according to claim 3, wherein the protrusions form an elevated chain having interruptions.

6. A mounting part according to claim 4, wherein the protrusions form an elevated chain having interruptions.

7. A mounting part according to claim 3, wherein the rings are radially interrupted at the diameter.

8. A mounting part according to claim 4, wherein the rings are radially interrupted at the diameter.

9. A mounting part according to claim 5, wherein the rings are radially interrupted at the diameter.

10. A mounting part according to claim 6, wherein the rings are radially interrupted at the diameter.

11. A mounting part according to claim 3, wherein the protrusions have a triangular, M-shaped, wedge-shaped, trapezoidal, or undulating cross section.

12. A mounting part according to claim 4, wherein the protrusions have a triangular, M-shaped, wedge-shaped, trapezoidal, or undulating cross section.

13. A mounting part according to claim 5, wherein the protrusions have a triangular, M-shaped, wedge-shaped, trapezoidal, or undulating cross section.

* * * * *